(12) United States Patent
Sokolov et al.

(10) Patent No.: US 7,924,648 B2
(45) Date of Patent: Apr. 12, 2011

(54) MEMORY POWER AND PERFORMANCE MANAGEMENT

(75) Inventors: Dotan Sokolov, Ra'anana (IL); Ofir Shalvi, Ra'anana (IL)

(73) Assignee: Anobit Technologies Ltd., Herzeliya Pituach (IL)

( * ) Notice: Subject to any disclaimer, the term of this patent is extended or adjusted under 35 U.S.C. 154(b) by 676 days.

(21) Appl. No.: 11/945,575

(22) Filed: Nov. 27, 2007

(65) Prior Publication Data

US 2008/0126686 A1 May 29, 2008

Related U.S. Application Data

(60) Provisional application No. 60/867,399, filed on Nov. 28, 2006, provisional application No. 60/868,342, filed on Dec. 3, 2006, provisional application No. 60/870,398, filed on Dec. 17, 2006.

(51) Int. Cl.
*G11C 5/14* (2006.01)

(52) U.S. Cl. ............ 365/226; 365/230.03; 365/189.011; 711/154

(58) Field of Classification Search .................. 365/226, 365/230.03, 189.011; 711/154
See application file for complete search history.

(56) References Cited

U.S. PATENT DOCUMENTS

| | | |
|---|---|---|
| 4,556,961 A | 12/1985 | Iwahashi et al. |
| 4,558,431 A | 12/1985 | Satoh |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |
| 5,056,089 A | 10/1991 | Furuta et al. |
| 5,077,722 A | 12/1991 | Geist et al. |
| 5,126,808 A | 6/1992 | Montalvo et al. |
| 5,172,338 A | 12/1992 | Mehrotta et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |

(Continued)

FOREIGN PATENT DOCUMENTS

EP 0783754 B1 7/1997

(Continued)

OTHER PUBLICATIONS

U.S. Appl. No. 12/019,011 Official Action dated Nov. 20, 2009.

(Continued)

*Primary Examiner* — Tuan T Nguyen
*Assistant Examiner* — Toan Le
(74) *Attorney, Agent, or Firm* — Fish & Richardson P.C.

(57) ABSTRACT

A method for storage includes collecting information regarding respective performance characteristics of a plurality of memory units in a memory array, each memory unit including one or more cells of the memory array. When data are received for storage in the memory array, a memory unit is selected responsively to the respective performance characteristics, and the received data are stored in the selected memory unit.

32 Claims, 3 Drawing Sheets

U.S. PATENT DOCUMENTS

| | | | |
|---|---|---|---|
| 5,473,753 A | 12/1995 | Wells et al. | |
| 5,479,170 A | 12/1995 | Cauwenberghs et al. | |
| 5,508,958 A | 4/1996 | Fazio et al. | |
| 5,519,831 A | 5/1996 | Holzhammer | |
| 5,541,886 A | 7/1996 | Hasbun | |
| 5,600,677 A | 2/1997 | Citta et al. | |
| 5,657,332 A | 8/1997 | Auclair et al. | |
| 5,675,540 A | 10/1997 | Roohparvar | |
| 5,682,352 A | 10/1997 | Wong et al. | |
| 5,696,717 A | 12/1997 | Koh | |
| 5,726,649 A | 3/1998 | Tamaru et al. | |
| 5,742,752 A | 4/1998 | De Koning | |
| 5,751,637 A | 5/1998 | Chen et al. | |
| 5,761,402 A | 6/1998 | Kaneda et al. | |
| 5,801,985 A | 9/1998 | Roohparvar et al. | |
| 5,838,832 A | 11/1998 | Barnsley | |
| 5,860,106 A | 1/1999 | Domen et al. | |
| 5,867,114 A | 2/1999 | Barbir | |
| 5,867,429 A | 2/1999 | Chen et al. | |
| 5,877,986 A | 3/1999 | Harari et al. | |
| 5,901,089 A | 5/1999 | Korsh et al. | |
| 5,909,449 A | 6/1999 | So et al. | |
| 5,912,906 A | 6/1999 | Wu et al. | |
| 5,930,167 A | 7/1999 | Lee et al. | |
| 5,937,424 A | 8/1999 | Leak et al. | |
| 5,942,004 A | 8/1999 | Cappelletti | |
| 5,991,517 A | 11/1999 | Harari et al. | |
| 5,995,417 A | 11/1999 | Chen et al. | |
| 6,009,014 A | 12/1999 | Hollmer et al. | |
| 6,034,891 A | 3/2000 | Norman | |
| 6,040,993 A | 3/2000 | Chen et al. | |
| 6,041,430 A | 3/2000 | Yamauchi | |
| 6,073,204 A | 6/2000 | Lakhani et al. | |
| 6,101,614 A | 8/2000 | Gonzales et al. | |
| 6,128,237 A | 10/2000 | Shirley et al. | |
| 6,134,140 A | 10/2000 | Tanaka et al. | |
| 6,134,143 A | 10/2000 | Norman | |
| 6,134,631 A | 10/2000 | Jennings | |
| 6,141,261 A | 10/2000 | Patti | |
| 6,166,962 A | 12/2000 | Chen et al. | |
| 6,178,466 B1 | 1/2001 | Gilbertson et al. | |
| 6,185,134 B1 | 2/2001 | Tanaka et al. | |
| 6,209,113 B1 | 3/2001 | Roohparvar | |
| 6,212,654 B1 | 4/2001 | Lou et al. | |
| 6,219,276 B1 | 4/2001 | Parker | |
| 6,219,447 B1 | 4/2001 | Lee et al. | |
| 6,222,762 B1 | 4/2001 | Guterman et al. | |
| 6,230,233 B1 | 5/2001 | Lofgren et al. | |
| 6,240,458 B1 | 5/2001 | Gilbertson | |
| 6,275,419 B1 | 8/2001 | Guterman et al. | |
| 6,279,069 B1 | 8/2001 | Robinson et al. | |
| 6,288,944 B1 | 9/2001 | Kawamura | |
| 6,292,394 B1 | 9/2001 | Cohen et al. | |
| 6,301,151 B1 | 10/2001 | Engh et al. | |
| 6,304,486 B1 | 10/2001 | Yano | |
| 6,307,776 B1 | 10/2001 | So et al. | |
| 6,317,363 B1 | 11/2001 | Guterman et al. | |
| 6,317,364 B1 | 11/2001 | Guterman et al. | |
| 6,345,004 B1 | 2/2002 | Omura et al. | |
| 6,360,346 B1 | 3/2002 | Miyauchi et al. | |
| 6,363,008 B1 | 3/2002 | Wong | |
| 6,363,454 B1 | 3/2002 | Lakhani et al. | |
| 6,366,496 B1 | 4/2002 | Torelli et al. | |
| 6,396,742 B1 | 5/2002 | Korsh et al. | |
| 6,397,364 B1 | 5/2002 | Barkan | |
| 6,405,323 B1 | 6/2002 | Lin et al. | |
| 6,418,060 B1 | 7/2002 | Yong et al. | |
| 6,442,585 B1 | 8/2002 | Dean et al. | |
| 6,456,528 B1 | 9/2002 | Chen | |
| 6,466,476 B1 | 10/2002 | Wong et al. | |
| 6,467,062 B1 | 10/2002 | Barkan | |
| 6,469,931 B1 | 10/2002 | Ban et al. | |
| 6,522,580 B2 | 2/2003 | Chen et al. | |
| 6,525,952 B2 | 2/2003 | Araki et al. | |
| 6,532,556 B1 | 3/2003 | Wong et al. | |
| 6,538,922 B1 | 3/2003 | Khalid et al. | |
| 6,558,967 B1 | 5/2003 | Wong | |
| 6,560,152 B1 | 5/2003 | Cernea | |
| 6,577,539 B2 | 6/2003 | Iwahashi | |
| 6,584,012 B2 | 6/2003 | Banks | |
| 6,615,307 B1 | 9/2003 | Roohparvar | |
| 6,621,739 B2 | 9/2003 | Gonzales et al. | |
| 6,643,169 B2 | 11/2003 | Rudelic et al. | |
| 6,678,192 B2 | 1/2004 | Gongwer et al. | |
| 6,687,155 B2 | 2/2004 | Nagasue | |
| 6,707,748 B2 | 3/2004 | Lin et al. | |
| 6,708,257 B2 | 3/2004 | Bao | |
| 6,717,847 B2 | 4/2004 | Chen | |
| 6,731,557 B2 | 5/2004 | Beretta | |
| 6,738,293 B1 | 5/2004 | Iwahashi | |
| 6,751,766 B2 | 6/2004 | Guterman et al. | |
| 6,757,193 B2 | 6/2004 | Chen et al. | |
| 6,774,808 B1 | 8/2004 | Hibbs et al. | |
| 6,781,877 B2 | 8/2004 | Cernea et al. | |
| 6,807,095 B2 | 10/2004 | Chen et al. | |
| 6,809,964 B2 | 10/2004 | Moschopoulos et al. | |
| 6,829,167 B2 | 12/2004 | Tu et al. | |
| 6,845,052 B1 | 1/2005 | Ho et al. | |
| 6,851,018 B2 | 2/2005 | Wyatt et al. | |
| 6,856,546 B2 | 2/2005 | Guterman et al. | |
| 6,862,218 B2 | 3/2005 | Guterman et al. | |
| 6,870,767 B2 | 3/2005 | Rudelic et al. | |
| 6,894,926 B2 | 5/2005 | Guterman et al. | |
| 6,907,497 B2 | 6/2005 | Hosono et al. | |
| 6,930,925 B2 | 8/2005 | Guo et al. | |
| 6,934,188 B2 | 8/2005 | Roohparvar | |
| 6,937,511 B2 | 8/2005 | Hsu et al. | |
| 6,963,505 B2 | 11/2005 | Cohen | |
| 6,972,993 B2 | 12/2005 | Conley et al. | |
| 6,988,175 B2 | 1/2006 | Lasser | |
| 6,992,932 B2 | 1/2006 | Cohen | |
| 7,002,843 B2 | 2/2006 | Guterman et al. | |
| 7,012,835 B2 | 3/2006 | Gonzales et al. | |
| 7,020,017 B2 | 3/2006 | Chen et al. | |
| 7,023,735 B2 | 4/2006 | Ban et al. | |
| 7,031,210 B2 | 4/2006 | Park et al. | |
| 7,031,214 B2 | 4/2006 | Tran | |
| 7,031,216 B2 | 4/2006 | You | |
| 7,039,846 B2 | 5/2006 | Hewitt et al. | |
| 7,042,766 B1 | 5/2006 | Wang et al. | |
| 7,054,193 B1 | 5/2006 | Wong | |
| 7,054,199 B2 | 5/2006 | Lee et al. | |
| 7,057,958 B2 | 6/2006 | So et al. | |
| 7,065,147 B2 | 6/2006 | Ophir et al. | |
| 7,068,539 B2 | 6/2006 | Guterman et al. | |
| 7,079,555 B2 | 7/2006 | Baydar et al. | |
| 7,088,615 B2 | 8/2006 | Guterman et al. | |
| 7,099,194 B2 | 8/2006 | Tu et al. | |
| 7,102,924 B2 | 9/2006 | Chen et al. | |
| 7,113,432 B2 | 9/2006 | Mokhlesi | |
| 7,130,210 B2 | 10/2006 | Bathul et al. | |
| 7,139,192 B1 | 11/2006 | Wong | |
| 7,139,198 B2 | 11/2006 | Guterman et al. | |
| 7,151,692 B2 | 12/2006 | Wu | |
| 7,170,802 B2 | 1/2007 | Cernea et al. | |
| 7,173,859 B2 | 2/2007 | Hemink | |
| 7,177,184 B2 | 2/2007 | Chen | |
| 7,177,195 B2 | 2/2007 | Gonzales et al. | |
| 7,177,199 B2 | 2/2007 | Chen et al. | |
| 7,177,200 B2 | 2/2007 | Ronen et al. | |
| 7,184,338 B2 | 2/2007 | Nagakawa et al. | |
| 7,187,195 B2 | 3/2007 | Kim | |
| 7,187,592 B2 | 3/2007 | Guterman et al. | |
| 7,190,614 B2 | 3/2007 | Wu | |
| 7,193,898 B2 | 3/2007 | Cernea | |
| 7,193,921 B2 | 3/2007 | Choi et al. | |
| 7,196,928 B2 | 3/2007 | Chen | |
| 7,197,594 B2 | 3/2007 | Raz et al. | |
| 7,200,062 B2 | 4/2007 | Kinsely et al. | |
| 7,221,592 B2 | 5/2007 | Nazarian | |
| 7,224,613 B2 | 5/2007 | Chen et al. | |
| 7,231,474 B1 | 6/2007 | Helms et al. | |
| 7,231,562 B2 | 6/2007 | Ohlhoff et al. | |
| 7,243,275 B2 | 7/2007 | Gongwer et al. | |
| 7,254,690 B2 | 8/2007 | Rao | |
| 7,257,027 B2 | 8/2007 | Park | |
| 7,259,987 B2 | 8/2007 | Chen et al. | |

| | | | | | | |
|---|---|---|---|---|---|---|
| 7,266,026 | B2 | 9/2007 | Gongwer et al. | 2006/0028877 A1 | 2/2006 | Avraham |
| 7,274,611 | B2 | 9/2007 | Roohparvar | 2006/0101193 A1 | 5/2006 | Murin |
| 7,277,355 | B2 | 10/2007 | Tanzana | 2006/0107136 A1 | 5/2006 | Gongwer et al. |
| 7,280,398 | B1 | 10/2007 | Lee et al. | 2006/0129750 A1 | 6/2006 | Lee et al. |
| 7,280,409 | B2 | 10/2007 | Misumi et al. | 2006/0133141 A1 | 6/2006 | Gorobets |
| 7,289,344 | B2 | 10/2007 | Chen | 2006/0156189 A1 | 7/2006 | Tomlin |
| 7,301,807 | B2 | 11/2007 | Khalid et al. | 2006/0179334 A1 | 8/2006 | Brittain et al. |
| 7,301,817 | B2 | 11/2007 | Li et al. | 2006/0203546 A1 | 9/2006 | Lasser |
| 7,308,525 | B2 | 12/2007 | Lasser et al. | 2006/0218359 A1 | 9/2006 | Sanders et al. |
| 7,310,255 | B2 | 12/2007 | Chan | 2006/0221705 A1 | 10/2006 | Hemink et al. |
| 7,310,272 | B1 | 12/2007 | Mokhlesi et al. | 2006/0221714 A1 | 10/2006 | Li et al. |
| 7,310,347 | B2 | 12/2007 | Lasser | 2006/0239077 A1 | 10/2006 | Park et al. |
| 7,321,509 | B2 | 1/2008 | Chen et al. | 2006/0256620 A1 | 11/2006 | Nguyen et al. |
| 7,342,831 | B2 | 3/2008 | Mokhlesi et al. | 2006/0256626 A1 | 11/2006 | Werner et al. |
| 7,345,928 | B2 | 3/2008 | Li | 2006/0256891 A1 | 11/2006 | Yuan et al. |
| 7,349,263 | B2 | 3/2008 | Kim et al. | 2006/0271748 A1 | 11/2006 | Jain et al. |
| 7,356,755 | B2 | 4/2008 | Fackenthal | 2006/0285392 A1 | 12/2006 | Incarnati et al. |
| 7,363,420 | B2 | 4/2008 | Lin et al. | 2006/0285396 A1 | 12/2006 | Ha |
| 7,397,697 | B2 | 7/2008 | So et al. | 2007/0006013 A1 | 1/2007 | Moshayedi et al. |
| 7,408,804 | B2 | 8/2008 | Hemink et al. | 2007/0019481 A1 | 1/2007 | Park |
| 7,409,473 | B2 | 8/2008 | Conley et al. | 2007/0033581 A1 | 2/2007 | Tomlin et al. |
| 7,420,847 | B2 | 9/2008 | Li | 2007/0047314 A1 | 3/2007 | Goda et al. |
| 7,433,231 | B2 | 10/2008 | Aritome | 2007/0047326 A1 | 3/2007 | Nguyen et al. |
| 7,437,498 | B2 | 10/2008 | Ronen | 2007/0050536 A1 | 3/2007 | Kolokowsky |
| 7,440,324 | B2 | 10/2008 | Mokhlesi | 2007/0058446 A1 | 3/2007 | Hwang et al. |
| 7,441,067 | B2 | 10/2008 | Gorobetz et al. | 2007/0061502 A1 | 3/2007 | Lasser et al. |
| 7,453,737 | B2 | 11/2008 | Ha | 2007/0067667 A1 | 3/2007 | Ikeuchi et al. |
| 7,460,410 | B2 | 12/2008 | Nagai et al. | 2007/0074093 A1 | 3/2007 | Lasser |
| 7,460,412 | B2 | 12/2008 | Lee et al. | 2007/0086239 A1 | 4/2007 | Litsyn et al. |
| 7,466,592 | B2 | 12/2008 | Mitani et al. | 2007/0086260 A1 | 4/2007 | Sinclair |
| 7,468,911 | B2 | 12/2008 | Lutze et al. | 2007/0089034 A1 | 4/2007 | Litsyn et al. |
| 7,471,581 | B2 | 12/2008 | Tran et al. | 2007/0091677 A1 | 4/2007 | Lasser et al. |
| 7,492,641 | B2 | 2/2009 | Hosono et al. | 2007/0091694 A1 | 4/2007 | Lee et al. |
| 7,508,710 | B2 | 3/2009 | Mokhlesi | 2007/0103978 A1 | 5/2007 | Conley et al. |
| 7,539,062 | B2 | 5/2009 | Doyle | 2007/0103986 A1 | 5/2007 | Chen |
| 7,551,492 | B2 | 6/2009 | Kim | 2007/0109845 A1 | 5/2007 | Chen |
| 7,570,520 | B2 | 8/2009 | Kamei et al. | 2007/0109849 A1 | 5/2007 | Chen |
| 7,593,259 | B2 | 9/2009 | Kim et al. | 2007/0118713 A1 | 5/2007 | Guterman et al. |
| 7,596,707 | B1 * | 9/2009 | Vemula ......................... 713/320 | 2007/0143378 A1 | 6/2007 | Gorobetz |
| 7,631,245 | B2 | 12/2009 | Lasser | 2007/0143531 A1 | 6/2007 | Atri |
| 7,633,802 | B2 | 12/2009 | Mokhlesi | 2007/0159889 A1 | 7/2007 | Kang et al. |
| 7,656,734 | B2 | 2/2010 | Thorp et al. | 2007/0159892 A1 | 7/2007 | Kang et al. |
| 7,660,158 | B2 | 2/2010 | Aritome | 2007/0159907 A1 | 7/2007 | Kwak |
| 7,660,183 | B2 * | 2/2010 | Ware et al. ............... 365/230.03 | 2007/0168837 A1 | 7/2007 | Murin |
| 7,742,351 | B2 | 6/2010 | Inoue et al. | 2007/0171714 A1 | 7/2007 | Wu et al. |
| 7,885,119 | B2 | 2/2011 | Li | 2007/0183210 A1 | 8/2007 | Choi et al. |
| 2001/0002172 | A1 | 5/2001 | Tanaka et al. | 2007/0189073 A1 | 8/2007 | Aritome |
| 2001/0006479 | A1 | 7/2001 | Ikehashi et al. | 2007/0195602 A1 | 8/2007 | Fong et al. |
| 2002/0038440 | A1 | 3/2002 | Barkan | 2007/0206426 A1 | 9/2007 | Mokhlesi |
| 2002/0118574 | A1 | 8/2002 | Gongwer et al. | 2007/0208904 A1 | 9/2007 | Hsieh et al. |
| 2002/0174295 | A1 | 11/2002 | Ulrich et al. | 2007/0226599 A1 | 9/2007 | Motwani |
| 2002/0196510 | A1 | 12/2002 | Hietala et al. | 2007/0236990 A1 | 10/2007 | Aritome |
| 2003/0002348 | A1 | 1/2003 | Chen et al. | 2007/0253249 A1 | 11/2007 | Kang et al. |
| 2003/0103400 | A1 | 6/2003 | Van Tran | 2007/0256620 A1 | 11/2007 | Viggiano et al. |
| 2003/0161183 | A1 | 8/2003 | Van Tran | 2007/0266232 A1 | 11/2007 | Rodgers et al. |
| 2003/0189856 | A1 | 10/2003 | Cho et al. | 2007/0271424 A1 | 11/2007 | Lee et al. |
| 2004/0057265 | A1 | 3/2004 | Mirabel et al. | 2007/0280000 A1 | 12/2007 | Fujiu et al. |
| 2004/0057285 | A1 | 3/2004 | Cernea et al. | 2007/0291571 A1 * | 12/2007 | Balasundaram ............... 365/227 |
| 2004/0083333 | A1 | 4/2004 | Chang et al. | 2008/0010395 A1 | 1/2008 | Mylly et al. |
| 2004/0083334 | A1 | 4/2004 | Chang et al. | 2008/0025121 A1 | 1/2008 | Tanzawa |
| 2004/0105311 | A1 | 6/2004 | Cernea et al. | 2008/0043535 A1 | 2/2008 | Roohparvar |
| 2004/0114437 | A1 | 6/2004 | Li | 2008/0049504 A1 | 2/2008 | Kasahara et al. |
| 2004/0160842 | A1 | 8/2004 | Fukiage | 2008/0049506 A1 | 2/2008 | Guterman |
| 2005/0007802 | A1 | 1/2005 | Gerpheide | 2008/0052446 A1 | 2/2008 | Lasser et al. |
| 2005/0013165 | A1 | 1/2005 | Ban | 2008/0055993 A1 | 3/2008 | Lee |
| 2005/0024941 | A1 | 2/2005 | Lasser et al. | 2008/0080243 A1 | 4/2008 | Edahiro et al. |
| 2005/0024978 | A1 | 2/2005 | Ronen | 2008/0082730 A1 | 4/2008 | Kim et al. |
| 2005/0086574 | A1 | 4/2005 | Fackenthal | 2008/0089123 A1 | 4/2008 | Chae et al. |
| 2005/0121436 | A1 | 6/2005 | Kamitani et al. | 2008/0104309 A1 | 5/2008 | Cheon et al. |
| 2005/0157555 | A1 | 7/2005 | Ono et al. | 2008/0104312 A1 | 5/2008 | Lasser |
| 2005/0162913 | A1 | 7/2005 | Chen | 2008/0109590 A1 | 5/2008 | Jung et al. |
| 2005/0169051 | A1 | 8/2005 | Khalid et al. | 2008/0115017 A1 | 5/2008 | Jacobson |
| 2005/0189649 | A1 | 9/2005 | Maruyama et al. | 2008/0123420 A1 | 5/2008 | Brandman et al. |
| 2005/0213393 | A1 | 9/2005 | Lasser | 2008/0126686 A1 | 5/2008 | Sokolov et al. |
| 2005/0224853 | A1 | 10/2005 | Ohkawa | 2008/0130341 A1 | 6/2008 | Shalvi et al. |
| 2005/0240745 | A1 | 10/2005 | Iyer et al. | 2008/0148115 A1 | 6/2008 | Sokolov et al. |
| 2005/0243626 | A1 | 11/2005 | Ronen | 2008/0151618 A1 | 6/2008 | Sharon et al. |
| 2006/0004952 | A1 | 1/2006 | Lasser | 2008/0151667 A1 | 6/2008 | Miu et al. |
| 2006/0028875 | A1 | 2/2006 | Avraham et al. | 2008/0158958 A1 | 7/2008 | Sokolov et al. |

| | | |
|---|---|---|
| 2008/0181001 A1 | 7/2008 | Shalvi |
| 2008/0198650 A1 | 8/2008 | Shalvi et al. |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0263262 A1 | 10/2008 | Sokolov et al. |
| 2008/0282106 A1 | 11/2008 | Shalvi et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0172257 A1 | 7/2009 | Prins et al. |
| 2009/0172261 A1 | 7/2009 | Prins et al. |
| 2009/0204824 A1 | 8/2009 | Lin et al. |
| 2009/0204872 A1 | 8/2009 | Yu et al. |
| 2009/0225595 A1 | 9/2009 | Kim |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0142277 A1 | 6/2010 | Yang et al. |
| 2010/0169743 A1 | 7/2010 | Vogan et al. |

FOREIGN PATENT DOCUMENTS

| | | |
|---|---|---|
| EP | 1434236 B1 | 6/2004 |
| EP | 1605509 A1 | 12/2005 |
| WO | 9610256 A1 | 4/1996 |
| WO | 9828745 A1 | 7/1998 |
| WO | 2002100112 A1 | 12/2002 |
| WO | 2007/000580 | 1/2007 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |

OTHER PUBLICATIONS

Takeuchi et al., "A Multipage Cell Architecture for High-Speed Programming Multilevel NAND Flash Memories", IEEE Journal of Solid State Circuits, vol. 33, No. 8, Aug. 1998.

Jedec Standard JESD84-C44, "Embedded MultiMediaCard (e•MMC) Mechanical Standard, with Optional Reset Signal", Jedec Solid State Technology Association, USA, Jul. 2009.

Jedec, "UFS Specification", version 0.1, Nov. 11, 2009.

SD Group and SD Card Association, "SD Specifications Part 1 Physical Layer Specification", version 3.01, draft 1.00, Nov. 9, 2009.

Compaq et al., "Universal Serial Bus Specification", revision 2.0, Apr. 27, 2000.

Serial ATA International Organization, "Serial ATA Revision 3.0 Specification", Jun. 2, 2009.

Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.

Agrell et al., "Closest Point Search in Lattices", IEEE Transactions on Information Theory, vol. 48, No. 8, pp. 2201-2214, Aug. 2002.

Bez et al., "Introduction to Flash memory", Proceedings of the IEEE, vol. 91, No. 4, pp. 489-502, Apr. 2003.

Blahut, R.E., "Theory and Practice of Error Control Codes," Addison-Wesley, May 1984, section 3.2, pp. 47-48.

Chang, L., "Hybrid Solid State Disks: Combining Heterogeneous NAND Flash in Large SSDs", ASPDAC, Jan. 2008.

Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.

Databahn™, "Flash memory controller IP", Denali Software, Inc., 1994 https://www.denali.com/en/products/databahn_flash.jsp.

Datalight, Inc., "FlashFX Pro 3.1 High Performance Flash Manager for Rapid Development of Reliable Products", Nov. 16, 2006.

Duann, N., Silicon Motion Presentation "SLC & MLC Hybrid", Flash Memory Summit, Santa Clara, USA, Aug. 2008.

Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.

Eitan et al., "Multilevel Flash Cells and their Trade-Offs", Proceedings of the 1996 IEEE International Electron Devices Meeting (IEDM), pp. 169-172, New York, USA 1996.

Engh et al., "A self adaptive programming method with 5 mV accuracy for multi-level storage in Flash", pp. 115-118, Proceedings of the IEEE 2002 Custom Integrated Circuits Conference, May 12-15, 2002.

Goodman et al., "On-Chip ECC for Multi-Level Random Access Memories," Proceedings of the IEEE/CAM Information Theory Workshop, Ithaca, USA, Jun. 25-29, 1989.

Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.

Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.

Horstein, "On the Design of Signals for Sequential and Nonsequential Detection Systems with Feedback," IEEE Transactions on Information Theory IT-12:4 (Oct.1966), pp. 448-455.

Jung et al., in "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.

Kawaguchi et al. 1995. A flash-memory based file system. In Proceedings of the USENIX 1995 Technical Conference, New Orleans, Louisiana. 155-164.

Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.

Lee et al., "Effects of Floating Gate Interference on NAND Flash Memory Cell Operation", IEEE Electron Device Letters, vol. 23, No. 5, pp. 264-266, May 2002.

Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.

Mielke et al., "Recovery Effects in the Distributed Cycling of Flash Memories", IEEE 44th Annual International Reliability Physics Symposium, pp. 29-35, San Jose, USA, Mar. 2006.

Onfi, "Open NAND Flash Interface Specification," revision 1.0, Dec. 28, 2006.

Phison Electronics Corporation, "PS8000 Controller Specification (for SD Card)", revision 1.2, Document No. S-07018, Mar. 28, 2007.

Shalvi, et al., "Signal Codes," Proceedings of the 2003 IEEE Information Theory Workshop (ITW'2003), Paris, France, Mar. 31-Apr. 4, 2003.

Shiozaki, A., "Adaptive Type-II Hybrid Broadcast ARQ System", IEEE Transactions on Communications, vol. 44, Issue 4, pp. 420-422, Apr. 1996.

Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.

ST Microelectronics, "Bad Block Management in NAND Flash Memories", Application note AN-1819, Geneva, Switzerland, May 2004.

ST Microelectronics, "Wear Leveling in Single Level Cell NAND Flash Memories," Application note AN-1822 Geneva, Switzerland, Feb. 2007.

Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.

Wu et al., "eNVy: A non-Volatile, Main Memory Storage System", Proceedings of the 6th International Conference on Architectural support for programming languages and operating systems, pp. 86-87, San Jose, USA, 1994.

International Application PCT/IL2007/000575 Patentability report dated Mar. 26, 2009.

International Application PCT/IL2007/000575 Search Report dated May 30, 2008.

International Application PCT/IL2007/000576 Patentability Report dated Mar. 19, 2009.

International Application PCT/IL2007/000576 Search Report dated Jul. 7, 2008.

International Application PCT/IL2007/000579 Patentability report dated Mar. 10, 2009.

International Application PCT/IL2007/000579 Search report dated Jul. 3, 2008.

International Application PCT/IL2007/000580 Patentability Report dated Mar. 10, 2009.

International Application PCT/IL2007/000580 Search Report dated Sep. 11, 2008.

International Application PCT/IL2007/000581 Patentability Report dated Mar. 26, 2009.

International Application PCT/IL2007/000581 Search Report dated Aug. 25, 2008.

International Application PCT/IL2007/001059 Patentability report dated Apr. 19, 2009.

International Application PCT/IL2007/001059 Search report dated Aug. 7, 2008.

International Application PCT/IL2007/001315 search report dated Aug. 7, 2008.

International Application PCT/IL2007/001315 Patentability Report dated May 5, 2009.

International Application PCT/IL2007/001316 Search report dated Jul. 22, 2008.

International Application PCT/IL2007/001316 Patentability Report dated May 5, 2009.

International Application PCT/IL2007/001488 Search report dated Jun. 20, 2008.

International Application PCT/IL2008/000329 Search report dated Nov. 25, 2008.

International Application PCT/IL2008/000519 Search report dated Nov. 20, 2008.

International Application PCT/IL2008/001188 Search Report dated Jan. 28, 2009.

International Application PCT/IL2008/001356 Search Report dated Feb. 3, 2009.

International Application PCT/IL2008/001446 Search report dated Feb. 20, 2009.

International Application PCT/IL2008/001446 "Optimized selection of memory chips in multi-chip memory devices" filed on Nov. 4, 2008.

Shalvi et al., U.S. Appl. No. 12/251,471 "Compensation For Voltage Drifts In Analog Memory Cells" filed on Oct. 15, 2008.

Kasorla et al, U.S. Appl. No. 12/332,370 "Efficient Data Storage in Multi-Plane Memory Devices" filed on Dec. 11, 2008.

Sommer, N., U.S. Appl. No. 12/364,531 "Parameter Estimation Based on Error Correction Code Parity Check Equations" filed on Feb. 3, 2009.

Golov et al., U.S. Appl. No. 12/344,233 "Wear Level Estimation in Analog Memory Cells" filed on Dec. 25, 2008.

Perlmutter et al., U.S. Appl. No. 12/388,528 "Programming of Analog Memory Cells Using a Single Programming Pulse per State Transition" filed on Feb. 19, 2009.

Perlmutter et al., U.S. Appl. No. 12/390,522 "Programming Analog Memory Cells for Reduced Variance After Retention" filed on Feb. 23, 2009.

Perlmutter et al., U.S. Appl. No. 12/405,275 "Memory Device with Multiple-Accuracy Read Commands" filed on Mar. 17, 2009.

Perlmutter et al., U.S. Appl. No. 12/397,368 "Efficient Readout from Analog Memory Cells Using Data Compression" filed on Mar. 4, 2009.

Sommer, N., U.S. Appl. No. 12/171,797 "Memory Device with Non-Uniform Programming Levels" filed on Jul. 11, 2008.

Perlmutter et al, U.S. Appl. No. 12/332,368 "Efficient Interference Cancellation in Analog Memory Cell Arrays" filed on Dec. 11, 2008.

Huffman, A., "Non-Volatile Memory Host Controller Interface (NVMHCI)", Specification 1.0, Apr. 14, 2008.

Panchbhai et al., "Improving Reliability of NAND Based Flash Memory Using Hybrid SLC/MLC Device", Project Proposal for CSci 8980—Advanced Storage Systems, University of Minnesota, USA, Spring 2009.

U.S. Appl. No. 11/957,970 Official Action dated May 20, 2010.

Shalvi et al., U.S. Appl. No. 12/822,207 "Adaptive Over-Provisioning in Memory Systems" filed on Jun. 24, 2010.

U.S. Appl. No. 11/949,135 Official Action dated Oct. 2, 2009.

U.S. Appl. No. 12/880,101 "Reuse of Host Hibernation Storage Space by Memory Controller", filed on Sep. 12, 2010.

U.S. Appl. No. 12/890,724 "Error Correction Coding Over Multiple Memory Pages", filed on Sep. 27, 2010.

U.S. Appl. No. 12/171,797 Official Action dated Aug. 25, 2010.

U.S. Appl. No. 12/497,707 Official Action dated Sep. 15, 2010.

U.S. Appl. No. 11/995,801 Official Action dated Oct. 15, 2010.

Numonyx, "M25PE16: 16-Mbit, page-erasable serial flash memory with byte-alterability, 75 MHz SPI bus, standard pinout", Apr. 2008.

Hong et al., "NAND Flash-based Disk Cache Using SLC/MLC Combined Flash Memory", 2010 International Workshop on Storage Network Architecture and Parallel I/Os, pp. 21-30, USA, May 3, 2010.

U.S. Appl. No. 12/045,520 Official Action dated Nov. 16, 2010.

U.S. Appl. No. 11/995,814 Official Action dated Dec.17, 2010.

U.S. Appl. No. 12/388,528 Official Action dated Nov. 29, 2010.

U.S. Appl. No. 12/251,471 Official Action dated Jan. 3, 2011.

Engineering Windows 7, "Support and Q&A for Solid-State Drives", e7blog, May 5, 2009.

Micron Technology Inc., "Memory Management in NAND Flash Arrays", Technical Note, year 2005.

Kang et al., "A superblock-based Flash Translation Layer for NAND Flash Memory", Proceedings of the 6th ACM & IEEE International Conference on Embedded Software, pp. 161-170, Seoul, Korea, Oct. 22-26, 2006.

Park et al., "Sub-Grouped Superblock Management for High-Performance Flash Storages", IEICE Electronics Express, vol. 6, No. 6, pp. 297-303, Mar. 25, 2009.

"How to Resolve "Bad Super Block: Magic Number Wrong" in BSD", Free Online Articles Director Article base, posted Sep. 5, 2009.

UBUNTU Forums, "Memory Stick Failed IO Superblock", posted Nov. 11, 2009.

Super User Forums, "SD Card Failure, can't read superblock", posted Aug. 8, 2010.

U.S. Appl. No. 12/987,174 filed on Jan. 10, 2011.
U.S. Appl. No. 12/987,175 filed on Jan. 10, 2011.
U.S. Appl. No. 12/963,649 filed on Dec. 9, 2010.
U.S. Appl. No. 13/021,754 filed on Feb. 6, 2011.
US 7,161,836, 01/2007, Wan et al. (withdrawn)

* cited by examiner

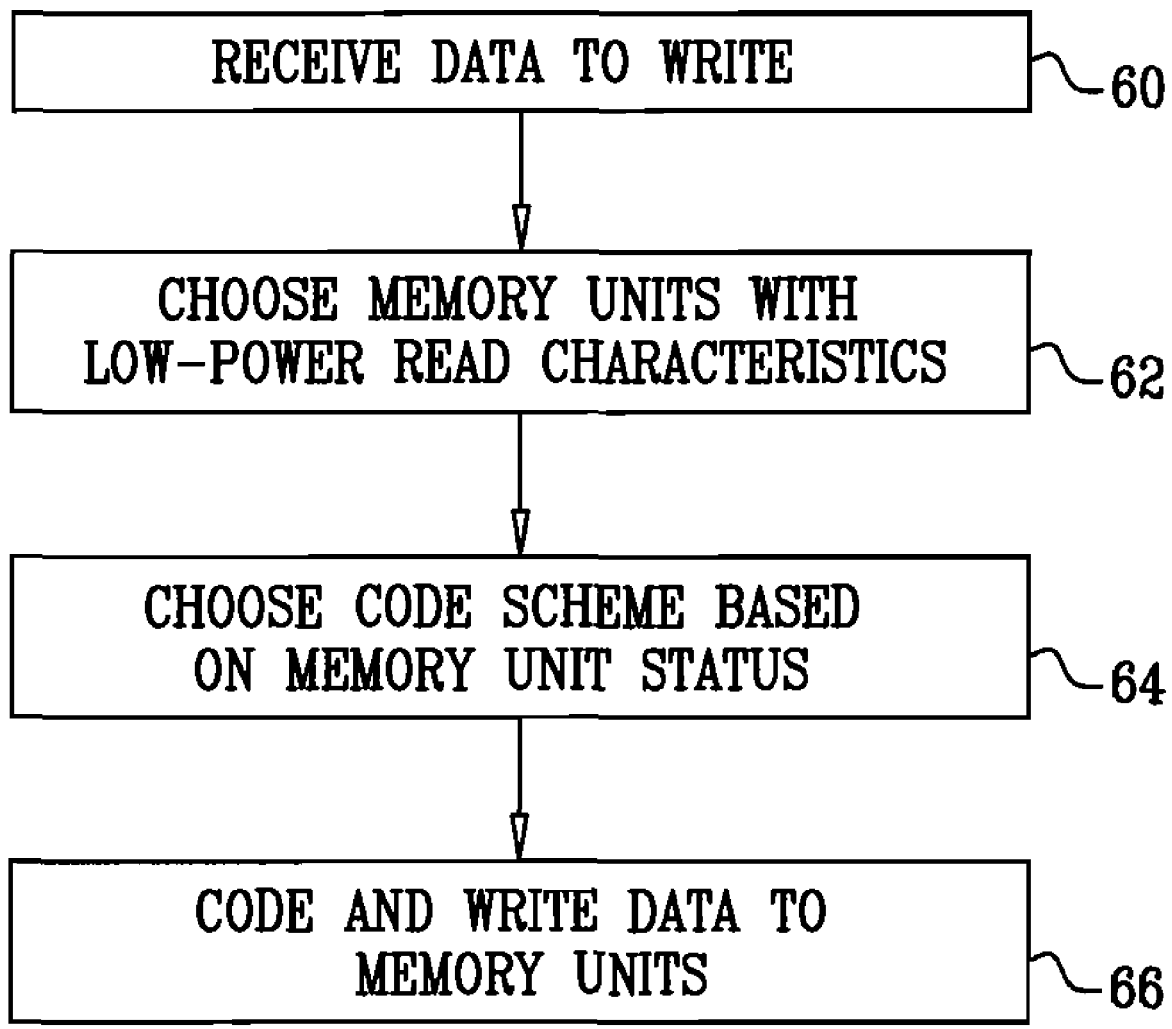

MEMORY POWER AND PERFORMANCE MANAGEMENT

CROSS-REFERENCE TO RELATED APPLICATIONS

This application claims the benefit of U.S. Provisional Patent Application No. 60/867,399, filed Nov. 28, 2006; U.S. Provisional Patent Application No. 60/868,342, filed Dec. 3, 2006; and U.S. Provisional Patent Application No. 60/870,398, filed Dec. 17, 2006. All of these related applications are incorporated herein by reference.

FIELD OF THE INVENTION

The present invention relates generally to memory devices, and particularly to methods and systems for writing and reading data to and from memory devices.

BACKGROUND OF THE INVENTION

Several types of memory devices, such as Flash memories, use arrays of analog memory cells for storing data. Each analog memory cell stores a quantity of an analog value, such as an electrical charge or voltage, which represents the information stored in the cell. In Flash memories, for example, each analog memory cell holds a certain amount of electrical charge. The range of possible analog values is typically divided into regions, each region corresponding to one or more data bit values. Data are written to an analog memory cell by writing a nominal analog value that corresponds to the desired bit or bits. The possible bit values that can be stored in an analog memory cell are also referred to as the memory states of the cell.

Some memory devices, commonly referred to as Single-Level Cell (SLC) devices, store a single bit of information in each memory cell, i.e., each memory cell can be programmed to assume one of two possible memory states. Higher-density devices, often referred to as Multi-Level Cell (MLC) devices, can be programmed to assume more than two possible memory states and thus store two or more bits per memory cell. In some cases, the number of bits stored per cell and the nominal analog values used in storing the bits may be varied in the course of operation of a memory.

For example, U.S. Pat. Nos. 6,643,169 and 6,870,767, whose disclosures are incorporated herein by reference, point out that there exists a tradeoff between the fidelity of data storage and the number of bits stored in a memory cell. The number of bits per cell may be increased when fidelity is less important and decreased when fidelity is more important. These patents describe a memory that can change between storage modes on a cell by cell basis.

Similarly, U.S. Pat. No. 6,466,476, whose disclosure is incorporated herein by reference, describes a multi-bit-per-cell non-volatile memory that stores different portions of a data stream using different numbers of bits per cell. In particular, data that require a high degree of data integrity (such as the header of a data frame) are stored using a relatively small number of bits per memory cell, while more error-tolerant data (such as music, images, or video) are stored using a relatively large number of bits per memory cell. Write circuitry decodes an input data stream and determines the number of bits to be written in each memory cell.

U.S. Patent Application Publication 2005/0024941, whose disclosure is incorporated herein by reference, describes a method and system for archiving data according to the desired data lifetime. For example, short-term data can be archived using larger programming voltage pulse increments than for long-term data; using a lower target threshold voltage than for long-term data; using wider programming voltage pulses than for long-term data; using higher starting programming voltages than for long-term data; using fewer programming voltage pulses than for long term data; using lower maximum programming voltages than for long term data; or using more levels per cell than for long-term data.

SUMMARY OF THE INVENTION

An embodiment of the present invention provides a method for storage that includes collecting information regarding respective performance characteristics of a plurality of memory units in a memory array, each memory unit comprising one or more cells of the memory array. The method includes receiving data for storage in the memory array, selecting a memory unit responsively to the respective performance characteristics, and storing the received data in the selected memory unit.

There is also provided, in accordance with another embodiment of the present invention, a method for storage, which includes receiving data from a host processor for storage by a memory controller in a memory array and receiving an input at the memory controller indicating that the memory controller is to operate in a power-saving mode. The data are written from the memory controller to the memory array in accordance with write parameters appropriate to the power-saving mode.

There is additionally provided, in accordance with an embodiment of the present invention, a method for storage, which includes receiving an instruction from a host processor to a memory controller to transfer data between a buffer and a memory array and receiving an input at the memory controller indicating that the memory controller is to operate in a high-throughput mode. The data are transferred between the buffer and the memory array using the memory controller at a throughput rate appropriate to the high-throughput mode.

Other embodiments of the present invention provide storage apparatus, which includes a memory controller that is configured to carry out the methods described above.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for storing data, in accordance with another embodiment of the present invention.

DETAILED DESCRIPTION OF EMBODIMENTS

Overview

Embodiments of the present invention that are described hereinbelow provide methods and devices for controlling performance features of a memory, and particularly for controlling the power consumption of the memory. These methods are typically implemented in a memory controller, which handles requests by a host processor to write to, erase and read from the memory. In deciding how to handle write requests, the memory controller accesses a record, which may be stored, for example, in a database, of respective performance characteristics of different memory units (groups of cells) in the memory. The controller chooses one or more memory units to use in serving a given write requests by matching the performance characteristics of the memory units to performance requirements, such as power consumption or throughput.

In some embodiments, the controller has different operating modes, which are invoked by instructions from the host processor or other input. The controller handles read and write requests differently depending on the operating mode. For example, when the memory is installed in a battery-powered device, the controller may receive an input when the device is disconnected from external power, indicating that it should operate in a power-saving mode. In power-saving mode, the controller will choose to write data to memory units that are characterized by relatively low power consumption, as indicated by the record of performance characteristics mentioned above. Additionally or alternatively, while in power-saving mode, the controller may write the data in a manner that saves power by writing at low bit-density, low voltage, or coarse precision, or using small number of programming steps, and/or low pre-processing strength (specifically low encoding strength), for example.

System Description

Figure 1:
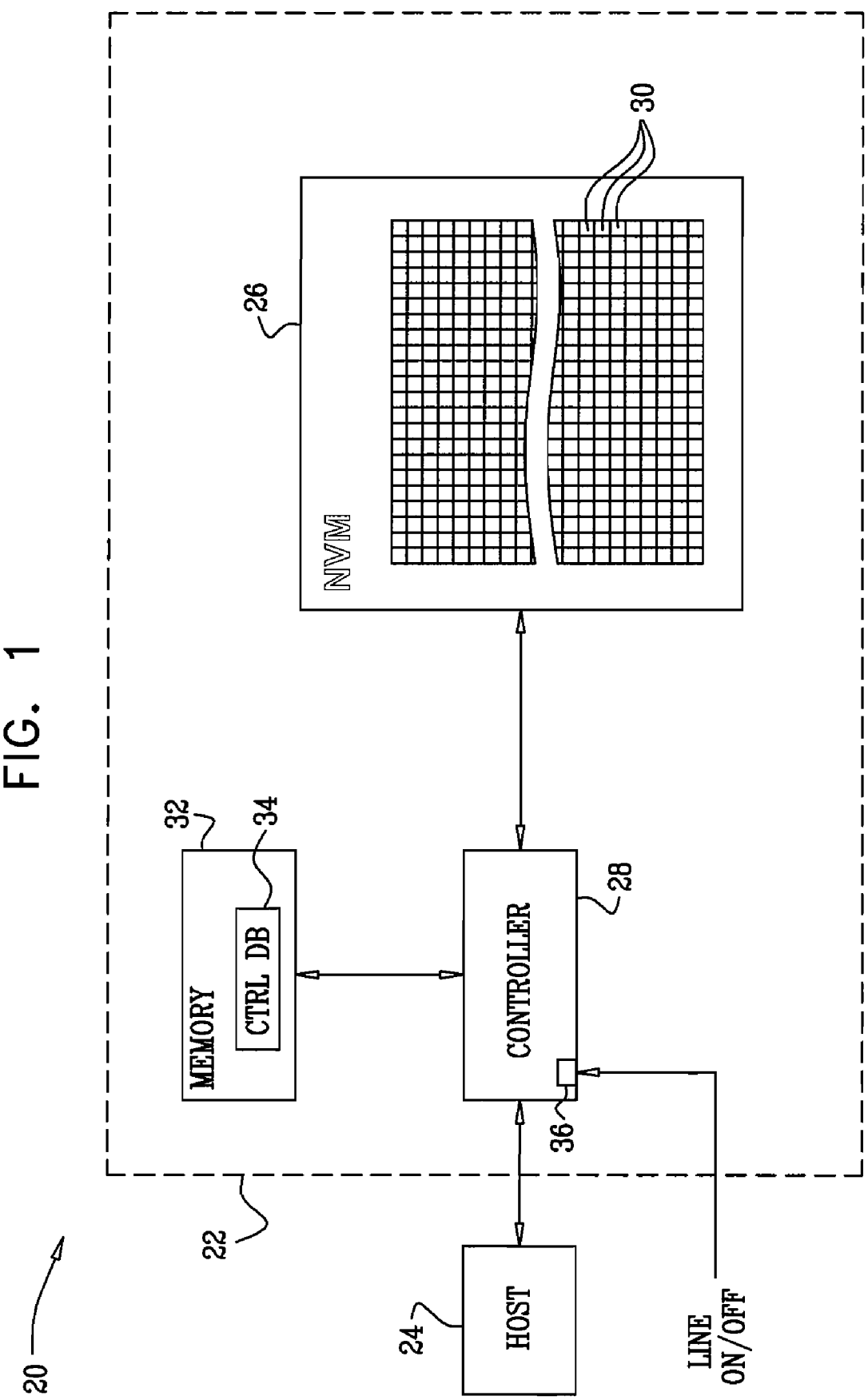
FIG. 1 is a block diagram that schematically illustrates a system for data storage, in accordance with an embodiment of the present invention.

FIG. 1 is a block diagram that schematically illustrates a system 20 for data storage, in accordance with an embodiment of the present invention. For the sake of illustration in the description that follows, it will be assumed that system 20 is part of a portable, battery-powered device, such as digital camera or portable media player. Such devices are normally capable of being connected to an external source of power, such as an AC power line or dedicated DC power supply or power supplied by a personal computer or other console via certain types of data connections, such as a USB connection. When the device is unplugged from the external power source, it is desirable that system 20 reduce its relative power consumption in order to prolong battery life.

System 20 comprises a memory subsystem 22 and a host processor 24, which writes data to and reads data from the memory subsystem. The host processor may also provide indications of application requirements to the memory subsystem with respect to certain read and write requests. For example, for a given file that is to be written to the memory subsystem, the host processor may indicate the desired throughput rate and/or reliability of writing, storing and/or reading the data in the file. The memory subsystem uses these indications in determining how and where to store the data, as explained in detail hereinbelow.

Memory subsystem 22 comprises a memory array 26, which is accessed and controlled by a memory controller 28. The memory controller selects the cells in the array to which data are to be written and read from in response to each request from host processor 24. The memory controller may also encode the data with suitable error correction codes before writing to the array, as well as decoding and correcting errors in the data upon readout. For these purposes, the controller may implement encoding and signal processing functions of the types described, for example, in PCT Patent Application PCT/IL2007/000580, filed May 10, 2007, which is assigned to the assignee of the present patent application and whose disclosure is incorporated herein by reference. Controller 28 and array 26 may be fabricated together on a single integrated circuit (IC) die, or they may alternatively be embodied in separate components, for example, on separate dies in a multi-chip package (MCP) or on separate IC. Although only a single memory array is shown in FIG. 1, controller 28 may alternatively interface with multiple memory arrays simultaneously in the manner described herein. Additionally or alternatively, although host processor 24 is shown in FIG. 1 as being separate from controller 28, the host processor and controller may be implemented as circuit component in the same chip Memory array 26 comprises a matrix of memory cells 30. In the examples that follow, it will be assumed that array 26 comprises analog non-volatile memory (NVM), such as MLC Flash memory. Alternatively, the principles of the present invention may be applied, mutatis mutandis, to memories of other kinds. For purposes of performance management by controller 28, cells 30 are divided into groups, which are referred to herein as memory units. A group for this purpose may comprise only a single cell, but typically each memory unit comprises multiple cells, for example:

A group of cells that is simultaneously programmed or read (such as a row of cells sharing a common wordline).

A page, corresponding to a certain data value or set of data values that are simultaneously programmed to a group of cells, or a sector within a page.

A group of pages, such as a block (which is typically a group of pages that are simultaneously erased).

An entire die or plane (wherein a die typically comprises two planes).

Controller 28 maintains a record of performance characteristics of the memory units in a memory 32. The record may conveniently be held in a control database 34, but other data structures may alternatively be used for this purpose. Typically, memory 32 comprises a volatile memory, such as random-access memory (RAM), which is used by the controller to hold control information and may be backed up in memory array 26 when system 20 is powered down. Alternatively, database 34 may be held in an area of array 26 or in a separate programmable read-only memory (PROM) (assuming the database is written once and not updated thereafter).

Table I below lists some of the performance characteristics that may be recorded for each memory unit in database 34. These characteristics are listed by way of example, and not limitation. In practice, database 34 may contain only a subset of these characteristics, and may also contain other relevant characteristics that are not listed below:

TABLE I

MEMORY UNIT PERFORMANCE CHARACTERISTICS

Status (cells available for data, bad cells, etc.)
Capacity parameters (number of bits/cell).
Wear level (number of write/erase cycles performed on this unit).
Signal characteristics, relating to the data storage quality and reliability of the memory unit, including:
    Noise variance of data stored in cells of the unit.
    Level of data retention error in the cells.
    Number of errors detected in recent read operations.
    Number of program-and-verify (P&V) iterations required to program cells in this unit.
    Required number of erase iterations.

TABLE I-continued

MEMORY UNIT PERFORMANCE CHARACTERISTICS

Speed characteristics, including:
    Time required to program the cells in the unit.
    Time required to erase the cells in the unit.
    Sensing time (also referred to as busy time, i.e.,
    time elapsed between a command by controller 28 to
    read data from the memory unit and data output
    from array 26).
    The amount (and hence duration) of post-processing
    (such as error correction code [ECC] decoding)
    required to detect the data read from the unit.
    The amount (and hence duration) of pre-processing
    (such as ECC encoding) required to reliably
    prepare the data for storage in this unit
Power consumption characteristics, including:
    Power and maximum voltage value required for
    writing data to the cells in the unit.
    Power required for erasing the unit.
    Power required for reading data from the cells in
    the unit.

In practice, the power consumption characteristics may be understood more broadly to include a number of the signal and speed characteristics listed above. For example, in some memory devices, factors causing slow performance (such as a large number of P&V cycles required to write to a cell or a long sensing time to read from a cell) also result in larger power consumption. Similarly, large numbers of errors in the cells in a given unit may require controller 28 to expend more power in correcting the errors when reading from these cells.

The highest voltage value required to write data to a given unit (listed above under power consumption characteristics) may be determined using methods described in the above-mentioned U.S. Provisional Patent Application No. 60/868,342. In analog memory devices that are known in the art, nominal voltage values, which are typically uniform over the entire memory array, are used for writing the appropriate bit values to the cells. The analog values that are actually stored in the memory cells, however, often deviate from the nominal values in accordance with a certain statistical distribution. Therefore, in subsystem 22, the statistical properties of the distribution of analog values stored in the cells of each memory unit may be measured, and the actual voltage values corresponding to different bit values may be adjusted for each unit based on these statistical properties. In consequence, different units may have different programming voltages, which are recorded in database 34. For example, memory units whose analog values have a relatively low mean and low variance may be assigned a lower programming voltage and thus are identified as requiring lower programming power.

The performance characteristics of each memory unit may be tested in production of memory array 26 and recorded in database 34 prior to installation of the memory array in system 20. Alternatively or additionally, these characteristics may be measured and/or updated after array 26 has been installed in system 20. For example, the performance characteristics may be measured by a diagnostic routine that runs when subsystem 22 is first powered up, and deliberately initiates certain program, read and erase operations. This sort of routine may be re-run intermittently over the life of system 20, typically as a background task of controller 28. As another option, controller 28 may monitor normal read, write and erase operations in order to update the database.

Subsystem 22 has a power-saving mode, which is invoked by a power control input 36 to controller 28. The input may be invoked by host processor 24 or manually by a user of system 20. Alternatively or additionally, controller 28 may be configured to sense, via input 36, whether system 20 is connected to an external source of power, as explained above, or is operating on internal battery power. The controller implements power-saving measures when operating on internal battery power. As a part of these measures, the controller may choose particular memory units to which it will write data depending on the specific power consumption characteristics of these memory units. The power-saving measures may be facilitated by preparatory and backup action that the control takes when external power is connected, as described further hereinbelow.

Behavior of controller 28 in power-saving mode may differ from one device to another. For example, digital cameras typically perform memory write operations while operating on battery power. In this case, the controller may choose memory units with low power consumption for writing images to memory. On the other hand, images are typically read out of the camera while the camera is connected to and receives power from a computer, so that power saving is not a consideration during read. By contrast, files are generally written to a portable media player (such as an MP3 player) while the player is connected to and receives power from a computer. In this case, it is more important that the files be written to subsystem 22 in a way that will facilitate low power consumption upon reading from memory array 26, which is usually performed under battery power.

As noted above, controller 28 may also have high-throughput and high-reliability modes of operation, which are typically invoked by host processor 24 in response to application requirements. (Typically, these alternative modes require relatively high power consumption.) For example, the high-throughput mode may be invoked for storage of video data, as opposed to audio or still-image data, which can tolerate low throughput. As another example, controller 28 may use the high-throughput mode to write data rapidly from a buffer to memory array 26 when the buffer is about to overflow, or to read data from the memory array to a buffer when the buffer is nearly empty. The high-reliability mode may be used when writing data to the memory array in order to specify a certain coding strength to be used by the controller or a target bit error rate (BER) that is to be maintained in the stored data.

Methods for Reducing Power Consumption

Figure 2:
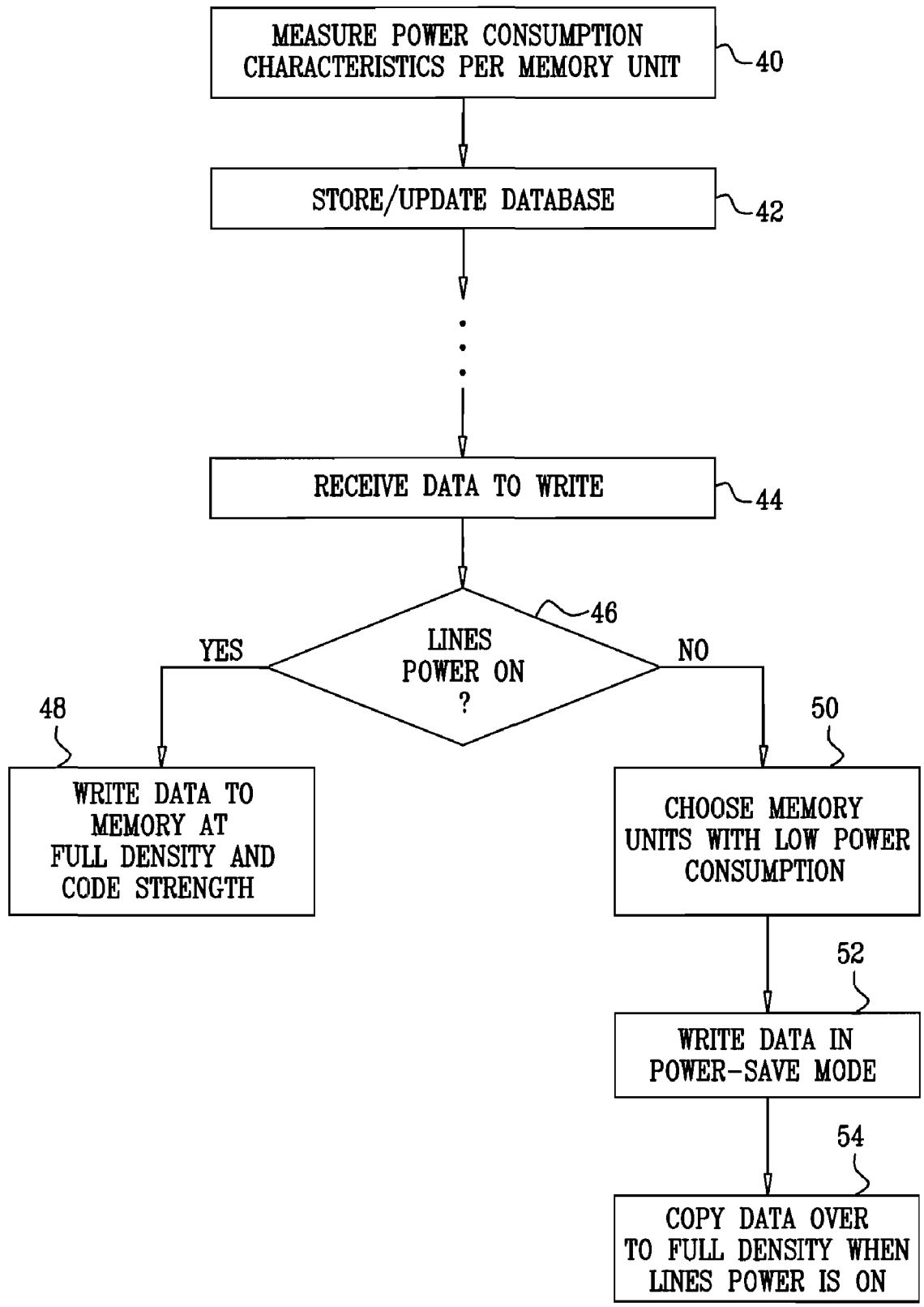
FIG. 2 is a flow chart that schematically illustrates a method for storing data, in accordance with an embodiment of the present invention.

FIG. 2 is a flow chart that schematically illustrates a method for storing data, in accordance with an embodiment of the present invention. Initially, power consumption characteristics of each memory unit in array 26 are measured, at a measurement step 40. As noted above, this step may be carried out either by memory controller 28 in situ or by an external tester at the time of production, or both. Typical power consumption characteristics are listed above in Table I. The measured characteristics are recorded in database 34, at a recording step 42. After the power consumption characteristics have been recorded, memory subsystem 22 is ready to operate in power-saving mode when required. (Some aspects of power-saving mode operation, however, may be implemented without a database of power consumption characteristics.)

Controller 28 checks which mode it is to use upon receiving data from host processor for writing to memory array 26, at a data input step 44. As noted above, power control input 36 may be activated by various different components and factors. In the present example, it is assumed that input 36 is connected to sense when system 20 is receiving power from an external source (referred to herein as a "line"), at a power sensing step 46.

If controller 28 determines at step 46 that the line power is on, it writes the data to memory array 26 in full-power mode, at a full-power writing step 48. Typically, when lines power is available, the controller employs a strong pre-processing algorithm. For example, the controller may compute a strong error-correcting code, and may write the data together with the code to a memory unit at the full data density that the unit is able to sustain (i.e., using the full number of bits/cell that the cells of the memory unit are capable of storing). An another example, the controller may use a strong compression algorithm to compress the data in full-power mode and a weaker algorithm in power-saving mode. Optionally, the controller may choose the memory unit and coding scheme so as to reduce the power that will be required to read out the data subsequently, as described further hereinbelow with reference to FIG. 3.

On the other hand, if controller 28 determines at step 46 that line power is off, it writes the data to memory array 26 in power-saving mode. For this purpose, the controller chooses one or more memory units whose power consumption characteristics (as recorded in database 34) indicate that they will require relatively low power to write, at a unit selection step 50. The selected memory units, for example, may be those that require relatively low voltage and low power and few P&V cycles for programming, as explained above.

Controller 28 writes the data to the selected memory units in accordance with write parameters appropriate to the power-saving mode, at a low-power write step 52. These write parameters may include, for example, data density, programming step size, and/or coding strength, as explained below:

Writing data at reduced density—The controller writes fewer bits/cell than would be possible if the cells were used at full capacity. Specifically, the controller may use only the lower voltage levels, thus exploiting only a narrow, low-voltage window within the overall range of levels supported by the cells. For instance, the controller may use only the two or four lowest levels of an eight-level (three bit) cell. As a result, the voltage and power applied in programming the cells are reduced.

Using larger incremental-step pulse programming (ISPP) increments in programming the cells—Flash memories are programmed by applying successive voltage steps to the cells, until the cells reach the desired levels. Increasing the size of the steps may reduce overall power consumption, although at the cost of larger programming errors.

Reducing the strength of pre-processing algorithms (such as ECC and/or compression algorithms, as noted above)—The "strength" of an ECC algorithm, for example, expresses the number and severity of errors that the code is able to correct or, equivalently, the computing power that must be invested in implementing the code. Reducing the strength of the code may mean using a simpler code or no code at all. In this way, the power consumed by the controller itself in code computation is reduced, at the possible expense of reduced reliability. When using this means of reducing power consumption, the controller may choose to write the data to memory units that have particularly good signal characteristics, as indicated in database 34 and listed in Table I above.

Additionally or alternatively, controller 28 may use other write parameters and may adopt other power-conserving measures, such as operating subsystem 22 at a reduced clock speed.

When lines power is restored to system 20, controller 28 may compensate for the compromises that were made in writing data in power-saving mode, at a data compensation step 54. Specifically, the controller may copy over data that were written at low density to other cells at full density. Additionally or alternatively, the controller may compress data that were written without compression in power-saving mode or may apply another stage of stronger compression to data that were only weakly compressed in power-saving mode. It may also be possible to perform maintenance tasks, such as refreshing cells, and to compute and store stronger error-correction codes at this stage. After copying the data in this manner, the controller may reuse the cells that originally held the data to storing additional data.

FIG. 3 is a flow chart that schematically illustrates a method for storing data, in accordance with another embodiment of the present invention. This method is directed particularly to writing data (typically in full-power mode) in a manner that will reduce the power needed to read the data in power-saving mode. It is useful, for example, in portable media players, which commonly write media files to memory while plugged into (and receiving power from) a personal computer, but then read and play back the media files under internal battery power.

The method of FIG. 3 is initiated when controller 28 receives data to write to memory array 26, at a data input step 60. The controller chooses memory units to which to write the data, at a unit selection step 62, based on the power-consumption characteristics of the units as recorded in database 34. For example, the controller may choose units that have low read power and/or low sensing time.

Controller 28 may choose a coding scheme that is appropriate for low-power readout, at a coding selection step 64. Typically, coding schemes that permit the controller to minimize the amount of decoding computation are desirable in this context. For example, the controller may use a turbo code, which is decoded at read time using an iterative decoding scheme. As a result, when the controller decodes the data subsequently in power-saving mode, it may simply stop at a certain point in the iteration, in order to avoid excess power consumption, and output the data even if not all of the errors have been resolved. As another example, the controller may choose a coding scheme that is appropriate to the wear level of the memory unit: When the wear level is low, so that few errors are expected on readout, the controller may use a weak error-correcting code, which minimizes power consumption in decoding. At higher wear levels, the controller may use a stronger code in order to deal with the higher expected error rate. (On the other hand, given cells having different wear levels, the controller may still choose to store data in cells with the higher wear level if these cells are characterized by low power consumption.)

After choosing the memory units and coding scheme, controller 28 encodes and writes the data to memory array 26, at a data writing step 66.

Although the methods of FIGS. 2 and 3 are described, for the sake of convenience and clarity, with reference to system 20 (FIG. 1), the principles embodied in these methods and in the use of the performance characteristics listed in Table I may similarly be applied in other sorts of memory and storage subsystems. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for storage, comprising:
collecting information regarding respective performance characteristics of a plurality of memory units in a memory array, each memory unit comprising one or more cells of the memory array;
receiving data for storage in the memory array;
selecting a memory unit responsively to the respective performance characteristics; and
storing the received data in the selected memory unit,
wherein the performance characteristics comprise a power consumption characteristic,
and wherein the power consumption characteristic is selected from a group of characteristics consisting of a number of program-and-verify iterations required to program the cells in each memory unit, a sensing time of the cells in each memory unit, and an amount of pre-processing required to prepare the data for storage in the cells in each memory unit.

2. The method according to claim 1, wherein selecting the memory unit comprises receiving an indication that the memory array is to operate in a power-saving mode, and selecting the memory unit responsively to the indication.

3. The method according to claim 2, wherein receiving the indication comprises sensing whether an electronic device in which the memory array is installed is connected to an external power source, and invoking the power-saving mode when the external power source is disconnected.

4. The method according to claim 2, wherein storing the received data comprises writing the data to the selected memory unit in accordance with write parameters responsive to the power-saving mode.

5. The method according to claim 1, wherein collecting the information comprises storing the information in a record accessible to a memory controller in an electronic device in which the memory array is installed, wherein the memory controller receives the data for storage from a host processor in the electronic device, and wherein selecting the memory unit comprises accessing the record using the memory controller.

6. The method according to claim 5, wherein collecting the information comprises evaluating the performance characteristics of the memory units before installation of the memory array in the electronic device.

7. The method according to claim 5, wherein collecting the information comprises evaluating the performance characteristics of the memory units after the memory array has been installed in the electronic device.

8. The method according to claim 7, wherein the performance characteristics are measured and stored in the record by the memory controller.

9. The method according to claim 1, wherein the performance characteristics comprise at least one performance characteristic selected from a group of the performance characteristics consisting of signal characteristics and speed characteristics.

10. A method for storage, comprising:
receiving data from a host processor for storage by a memory controller in a memory array;
receiving an input at the memory controller indicating that the memory controller is to operate in a power-saving mode; and
writing the data from the memory controller to the memory array in accordance with write parameters appropriate to the power-saving mode,
wherein the memory array comprises cells that are capable of storing a first number of bits per cell, and wherein writing the data comprises, while the memory controller is operating in the power-saving mode, programming the cells with a second number of bits per cell, which is less than the first number.

11. The method according to claim 10, wherein receiving the input comprises sensing whether an electronic device in which the memory array is installed is connected to an external power source, and invoking the power-saving mode when the external power source is disconnected.

12. The method according to claim 10, and comprising copying the data when the memory controller is operating in a full-power mode so as to store the data at the first number of bits per cell.

13. The method according to claim 10, wherein writing the data comprises programming the memory array while the memory controller is operating in a full-power mode so as to reduce an amount of power consumed in subsequently reading the data from the memory array while the memory controller is operating in the power-saving mode.

14. The method according to claim 13, wherein programming the memory array comprises selecting cells of the memory array having low-power read characteristics, and writing the data to the selected cells.

15. The method according to claim 13, wherein programming the memory array comprises writing the data to cells of the memory array having a given wear level, and encoding the data for storage in the cells using a code selected responsively to the wear level.

16. The method according to claim 13, wherein programming the memory array comprises writing the data to cells of the memory array having a given level of error, and encoding the data for storage in the cells using a code selected responsively to the level of the error.

17. A method for storage, comprising:
receiving data from a host processor for storage by a memory controller in a memory array;
receiving an input at the memory controller indicating that the memory controller is to operate in a power-saving mode; and
writing the data from the memory controller to the memory array in accordance with write parameters appropriate to the power-saving mode,
wherein writing the data comprises applying a pre-processing algorithm to the data before programming the cells, and modifying a strength of the pre-processing algorithm responsively to the input.

18. The method according to claim 17, wherein applying the pre-processing algorithm comprises encoding the data for storage using an error-correcting code having a given code strength while the memory controller is operating in a full-power mode, and wherein modifying the strength comprises reducing the code strength that is applied to the data for storage while the memory controller is operating in the power-saving mode.

19. The method according to claim 17, wherein applying the pre-processing algorithm comprises compressing the data for storage, and wherein modifying the strength comprises reducing the strength of compression that is applied to the data for storage while the memory controller is operating in the power-saving mode.

20. A method for storage, comprising:
receiving data from a host processor for storage by a memory controller in a memory array;
receiving an input at the memory controller indicating that the memory controller is to operate in a power-saving mode; and
writing the data from the memory controller to the memory array in accordance with write parameters appropriate to the power-saving mode,
wherein the data are written to the memory array using incremental-step pulse programming (ISPP) increments of a given size while the memory controller is operating in a full-power mode, and wherein writing the data comprises modifying the size of the ISPP increments that are used to write the data to the memory array while the memory controller is operating in the power-saving mode.

21. A storage apparatus, comprising:
a memory, which is configured to store a record of respective performance characteristics of a plurality of memory units in a memory array, each memory unit comprising one or more cells of the memory array; and
a memory controller, which is coupled to receive data for storage in the memory array, and to select a memory unit responsively to the respective performance characteristics, and to store the received data in the selected memory unit,
wherein the performance characteristics comprise a power consumption characteristic,
and wherein the power consumption characteristic is selected from a group of characteristics consisting of a number of program-and-verify iterations required to program the cells in each memory unit, a sensing time of the cells in each memory unit, and an amount of pre-processing required to prepare the data for storage in the cells in each memory unit.

22. The apparatus according to claim 21, wherein the memory controller is coupled to receive an indication that the memory is to operate in a power-saving mode, and to select the memory unit responsively to the indication.

23. The apparatus according to claim 21, wherein the memory controller and the memory array are installed in an electronic device, which comprises a host processor that passes the data to the memory controller for storage in the memory array.

24. The apparatus according to claim 21, wherein the performance characteristics comprise at least one performance characteristic selected from a group of the performance characteristics consisting of signal characteristics and speed characteristics.

25. A storage apparatus, comprising a memory controller, which is configured to receive data from a host processor for storage by the memory controller in a memory array,
wherein the memory controller comprises an input for receiving an indication that the memory controller is to operate in a power-saving mode and is configured, in response to the indication, to write the data to the memory array in accordance with write parameters appropriate to the power-saving mode,
wherein the memory array includes cells that are capable of storing a first number of bits per cell, and wherein the memory controller is configured, while operating in the power-saving mode, to program the cells with a second number of bits per cell, which is less than the first number.

26. The apparatus according to claim 25, wherein the memory controller is configured to sense, via the input, whether an electronic device in which the memory is installed is connected to an external power source, and to invoke the power-saving mode when the external power source is disconnected.

27. The apparatus according to claim 25, wherein the memory controller is configured, while operating in a full-power mode, to copy the data to the memory array at the first number of bits per cell.

28. The apparatus according to claim 25, wherein the memory controller is configured to program the memory array while the memory controller is operating in a full-power mode so as to reduce an amount of power consumed in reading the data from the memory array while the memory controller is operating in the power-saving mode.

29. A storage apparatus, comprising a memory controller, which is configured to receive data from a host processor for storage by the memory controller in a memory array,
wherein the memory controller comprises an input for receiving an indication that the memory controller is to operate in a power-saving mode and is configured, in response to the indication, to write the data to the memory array in accordance with write parameters appropriate to the power-saving mode,
and wherein the memory controller is configured to apply a pre-processing algorithm to the data before programming the cells, and to modify a strength of the pre-processing algorithm responsively to the indication.

30. A storage apparatus, comprising a memory controller, which is configured to receive data from a host processor for storage by the memory controller in a memory array,
wherein the memory controller comprises an input for receiving an indication that the memory controller is to operate in a power-saving mode and is configured, in response to the indication to write the data to the memory array in accordance with write parameters appropriate to the power-saving mode,
and wherein the memory controller is configured, while operating in a full-power mode, to write the data to the memory array using incremental-step pulse programming (ISPP) increments of a given size, and to modify the size of the ISPP increments that are used to write the data to the memory while the memory controller is operating in the power-saving mode.

31. A storage apparatus, comprising:
a memory array comprising a plurality of memory cells, which are arranged in memory units, each memory unit comprising one or more of the cells of the memory array and having respective performance characteristics; and
a memory controller, which is coupled to receive data for storage in the memory array, and to select a memory unit responsively to the respective performance characteristics of the memory unit, and to store the received data in the selected memory unit,
wherein the performance characteristics comprise a power consumption characteristic,
and wherein the power consumption characteristic is selected from a group of characteristics consisting of a number of program-and-verify iterations required to program the cells in each memory unit, a sensing time of the cells in each memory unit, and an amount of pre-processing required to prepare the data for storage in the cells in each memory unit.

32. A storage apparatus, comprising:
a memory array comprising a plurality of memory cells; and
a memory controller, which is configured to receive data from a host processor and to receive an input indicating that the storage device is to operate in a power-saving mode, and to write the data to the memory array in accordance with write parameters appropriate to the power-saving mode,
wherein the memory array comprises cells that are capable of storing a first number of bits per cell, and wherein writing the data comprises, while the memory controller is operating in the power-saving mode, programming the cells with a second number of bits per cell, which is less than the first number.

* * * * *